United States Patent [19]
Hiben et al.

[11] Patent Number: 5,541,953
[45] Date of Patent: Jul. 30, 1996

[54] DATA TRANSMISSION METHOD AND APPARATUS FOR USE IN LOW BW:$R_S$ APPLICATIONS

[75] Inventors: Bradley M. Hiben, Glen Ellyn; James K. Gehrke, Lake in the Hills; Terry K. Mansfield, Palatine, all of Ill.

[73] Assignee: Motorola, Inc., Schaumburg, Ill.

[21] Appl. No.: 383,285

[22] Filed: Feb. 3, 1995

[51] Int. Cl.$^6$ .......................... H04L 27/04; H04L 27/12; H04L 27/20

[52] U.S. Cl. .......................... 375/295; 375/350; 375/296; 364/724.01; 327/557

[58] Field of Search .................................. 375/295, 296, 375/298, 261, 283, 279, 308, 346, 350, 351; 364/724.01, 724.11, 718, 825; 327/551, 552

[56] References Cited

U.S. PATENT DOCUMENTS 5,363,410  11/1994  Hayashi .............................. 375/261 X Primary Examiner—Stephen Chin
Assistant Examiner—Bryan E. Webster
Attorney, Agent, or Firm—James A. Coffing

[57] ABSTRACT

A data transmission scheme for use in a low channel bandwidth-to-modulation symbol rate ratio (BW:$R_s$) application employing a linear modulator for producing in-phase and quadrature (I and Q) components of a data stream inputted at a predetermined symbol rate. This transmission method allows for the recovery of signals having unfavorable delay spread characteristics. That is, a specialized function is used to process the I and Q components, whose time domain transfer characteristic remains within a predetermined range of a data constellation point for a duration that exceeds 25 percent of a symbol period corresponding to the predetermined symbol rate. The processed response is then band-limited to produce a modulation signal that is usable in the low BW:$R_S$ application.

20 Claims, 4 Drawing Sheets

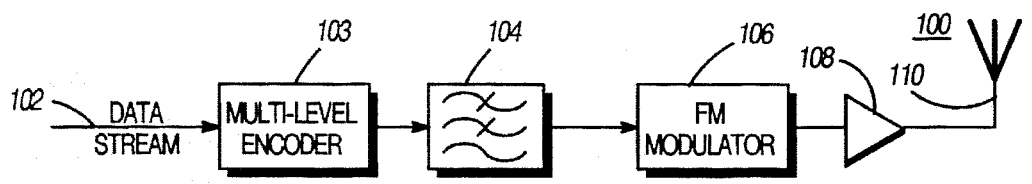
FIG.1 — PRIOR ART —
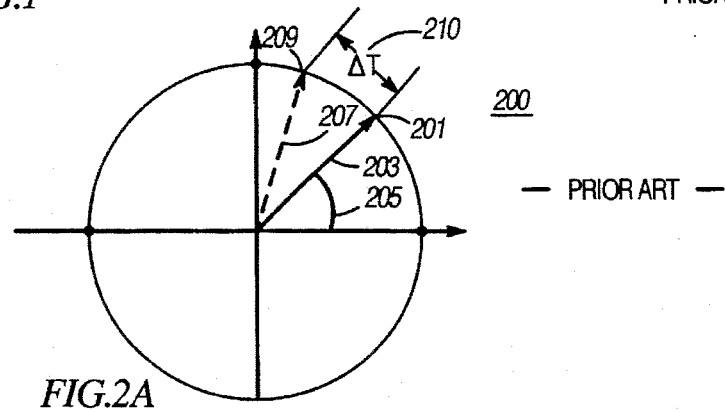
FIG.2A — PRIOR ART —
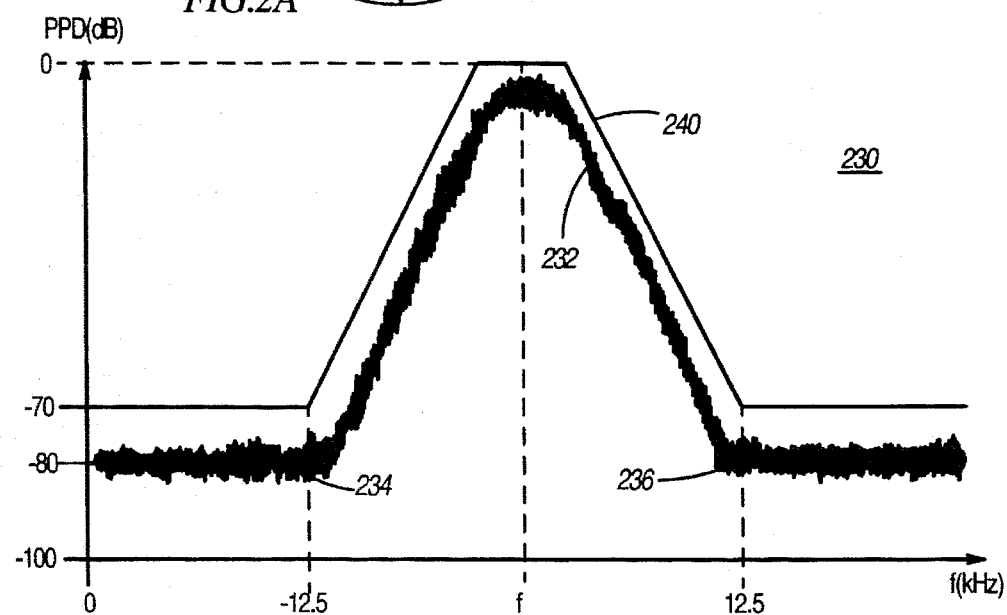
FIG.2B — PRIOR ART —
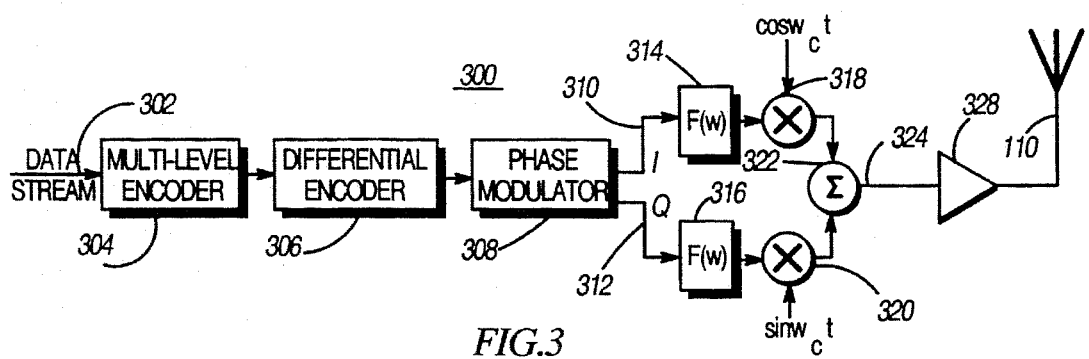
FIG.3

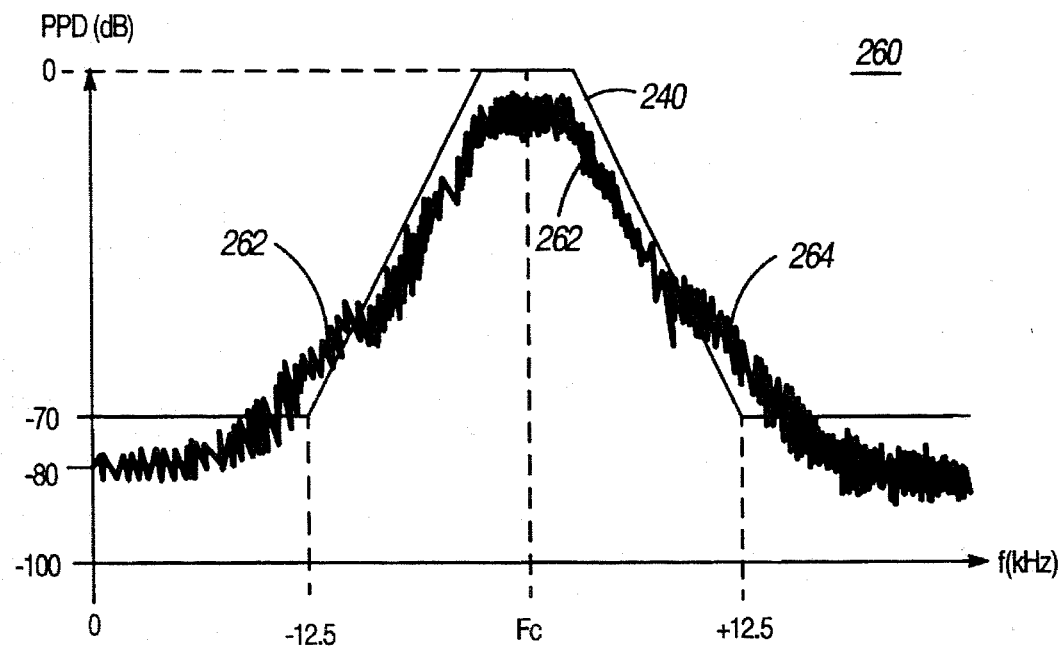
FIG.2C —PRIOR ART—
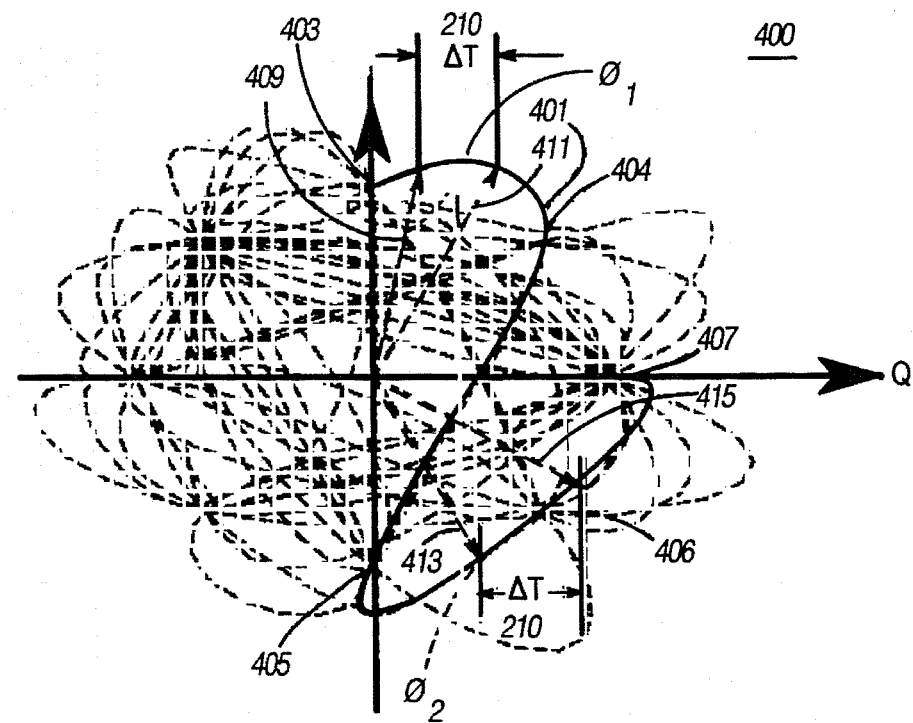
FIG.4B

DATA TRANSMISSION METHOD AND APPARATUS FOR USE IN LOW BW:$R_S$ APPLICATIONS

FIELD OF THE INVENTION

The present invention relates generally to data transmission systems, and in particular to such systems that are usable in low channel bandwidth-to-modulation symbol rate ratio applications, such as the APCO Project 25 communications environment.

BACKGROUND OF THE INVENTION

Radio communication systems are known in the art. Simulcast radio communication systems, are known to include a plurality of transmitter locations that substantially simultaneously transmit the same modulated information (e.g., digitized audio, data) on the same radio frequency (RF) carrier. This allows the information to be received by a widely spaced group of users. Simulcast system designers are faced with numerous problems that, while not unique to simulcast operation, require more complex solutions than their conventional communication system counterparts. In particular, the fact that users can receive transmitted signals from multiple locations that have propagated different distances produces a notable problem of simulcast operation—i.e., so-called multipath delay spread, which is defined as multiple signals having substantially the same RF carrier frequency and substantially the same modulation being received with a significant time differential or relative delay. This delay limits maximum site separation.

Moreover, requirements for spectrum efficiency tend to reduce the inherent tolerance for multipath delay, making this issue play an even more important role in the design scheme for a modern simulcast system. Spectrum efficient systems are defined as those having a low channel bandwidth-to-modulation symbol rate ratio. One example of a simulcast design challenge arises when attempting to merge acceptable simulcast properties with an otherwise incompatible communications environment, such as the so-called APCO-Project 25 system environment. This system is designed for use as the highly spectrum efficient digital communication approach for the next generation of public safety two way radios. This system has a narrow channelization (12.5 kHz) with proportionally high modulation symbol rate (4.8 kHz)—i.e., channel spacing/symbol rate ratio of 2.6. Such systems typically can tolerate multipath delay spreads of only about 40 microseconds.

Unfortunately for system designers, this limited delay immunity is problematic, as it constrains maximum site separation to approximately eight miles. Typical users, however require a design approach that obtains improved spectrum efficiency, while operating near the current system maximum 20 mile site separation (i.e., equivalent to approximately 100 microsecond delay). In the past, these problems have been resolved using a unique frequency modulation to produce a simulcast signal that is incompatible with conventional APCO Project 25 (hereafter, "APCO-25") receivers, as next described.

FIG. 1 shows a simplified block diagram of a prior art data transmitter 100. Information to be presently transmitted is represented by a data stream 102, which is inputted to a multi-level encoder 103 followed by a low pass filter 104. The filtered components are then digitally modulated using an FM modulator 106, as later described. The modulated waveform is then amplified using an amplifier stage 108 before being transmitted over the air, via a conventional antenna 110. This constant amplitude, frequency modulation approach is standard for today's APCO-25 transmitters, as it allows the use of more efficient and lower cost non-linear power amplifiers 108.

FIG. 2A shows a polar constellation diagram 200 that typifies the FM modulation scheme illustrated in FIG. 1. A constant envelope phasor (i.e., constant amplitude independent of phase magnitude) 203 describes the magnitude circle of the modulation phasor. In this representation, the rate of phase angle change over time defines each of four data levels in the constellation. For example, the time required for the phasor 203 to make the transition from a phase angle 205 (i.e., at position 201) to the phase angle shown at position 209 (i.e., denoted by dashed phasor 207) defines a particular data value. It should be noted that this modulation scheme requires a relatively constant rate of transition between constellation rotation speeds to limit transmitter power spectrum.

FIG. 2B shows a frequency domain transmitter power spectrum characteristic curve 230 for the constant envelope frequency modulation scheme (e.g., as defined in the TIA APCO-25 Air Interface) employed by the transmitter shown in FIG. 1. The power spectrum curve 230 illustrates the relationship between the peak power density (PPD) and frequency (f). Regulatory agencies (e.g., Federal Communications Commission, FCC) generally control this power spectrum to prevent interference with adjacent channel users by a maximum limit curve 240 (referred to herein as "mask 240"). Expressed mathematically, the sideband spectrum specification is given by:

$f_d$<2.5 kHz; when Att=0 dB;

2.5 kHz<$f_d$<12.5 kHz; when Att=7·($f_d$−2.5 kHz) dB; and $f_d$>12.5 kHz; when Att=50+10$\log_{10}$(RFOP) dB or 70 dB (whichever is smaller)

where;

$f_d$=magnitude (in kHz) of a difference between an operating frequency and an emission component frequency;

Att=required attenuation level (in dB), such that a power level of the emission component is below an unmodulated output power level for the data transmitter; and RFOP=RF Output Power (in Watts) for the data transmitter.

That is, a transmitter's peak power curve 232 must fall below the mask 240 at all frequencies for legal operation of the transmitter, e.g., in an APCO-25 application. It should be noted that frequencies 234 and 236 generally define the center frequencies of the adjacent channels.

FIG. 2C shows a frequency domain transmitter power spectrum characteristic 260 that results for a different type of prior art constant envelope modulation, e.g., Motorola's so-called "Astro Wide Pulse Modulation" scheme, which was designed for high immunity to differential delay using a constant envelope transmitter. Note that while this modulation scheme is designed for the same bit rate as APCO-25 systems, and will pass the information in the APCO-25 protocol, it is not detectable by a standard APCO-25 receiver. In addition, this modulation's peak power density is shown to be outside the mask requirements 240 for a 12.5 kHz channel in the sideband areas 262, 264. Consequently, two channels must be used for simulcast operation, thereby reducing spectrum efficiency.

Given the foregoing limitations, it is important to note that an APCO-25 modulation system has the unique characteristic that allows receiver compatibility with a second type of transmitter modulation. As an example, FIG. 3 shows a simplified block diagram of a transmitter employing one such modulation scheme. This modulation scheme is designed to fit within a 6.25 kHz bandwidth, but is compatible with standard APCO-25 receiver operation. The improved bandwidth approach requires linear modulation of amplitude and phase, and linear amplification in the transmitter power amplifier. The information to be presently transmitted 102 is inputted to a multi-level encoder 304 followed by a differential encoder 306, as is known in the art. The signal is then split into in-phase (I) and quadrature (Q) bit streams using the phase modulator 306. Both of these bit streams are passed through a processing function $F(\omega)$ designated by reference numbers 314,316. It should be noted that these processing functions are conventionally used to band limit or low-pass filter the modulated signal to control the transmitter power spectrum in a similar manner to the low-pass filter 104 shown in FIG. 1. These filters are conventionally designed to have impulse frequency response characteristics with square (very high corner slope) band pass traits, thereby minimizing intersymbol interference.

Mixers 318 and 320 are used to translate the base-band modulation signals to an RF center frequency, $f_C$. The in-phase and quadrature signals are combined using a summer 322 to form a single RF signal 324. The modulated waveform 324 is then amplified using a linear amplifier stage 328 before being transmitted over the air, via a conventional antenna 110.

FIG. 4A illustrates the frequency domain power spectrum characteristics 430 that results from the transmission scheme shown in FIG. 3. The power density peak envelope curve 432 of this modulation scheme falls well within the required 12.5 kHz regulatory mask 240. Further, the peak power curve points 434, 436 are approximately 70 dB below the carrier power at approximately 6.25 kHz from the carrier frequency. As those skilled in the art will recognize, this modulation scheme is designed to minimize the bandwidth of the power spectrum. However, because of the uniform rate of phase change produced by the filtering functions 314, 316 shown in FIG. 3, there is no significant improvement in the multipath delay immunity characteristics using this modulation approach.

FIG. 4B shows an I and Q constellation diagram 400 that results from the amplitude and phase controlled transmission scheme known as CQPSK as employed by the transmitter of FIG. 3. Constellation points 403–407 constitute a plurality of the eight points defining modulation data values. The curve 401 (i.e., darkened trace) shows a transition through constellation points 403–404–405–406–407. Unlike the embodiments discussed earlier, phasors (409, 411, 413, 415) have different amplitudes throughout the phase transitions, but exhibit substantially constant angular velocity. By way of example, phasors 409, 411 illustrate a phase transition $\phi 1$ requiring a duration of $\Delta T$ 210, with slightly changing phasor amplitudes. Similarly, phasors 413, 415 show a phase transition $\phi 2$ requiring the same duration $\Delta T$ 210, where $\phi 1$ and $\phi 2$ are substantially equal. That is, the phase angle change rates are approximately the same, whether the modulation is near a constellation point (e.g., phasors 413, 415) or midway between constellation points (e.g., phasors 409, 411). Of course, the relatively constant phase angle change rates on the transition curves are designed for smooth changes in phase, which indicates a tendency to produce a narrow bandwidth transmitter power density spectrum. Further, this modulation is designed to be compatible with the same receiver designed for the constant amplitude constellation shown in FIG. 2A, only having a higher level of spectrum efficiency.

Accordingly, there exists a need for a data transmission system that can be made compatible with an APCO-25 communications environment. Moreover, such a system should be compatible with today's standard APCO-25 receivers, and should not be constrained by the shortcomings of the prior art. In particular, a transmitter data modulation that meets the requirements of a standard APCO-25 receiver, while maintaining compatibility with a simulcast environment, would be an improvement over the prior art.

BRIEF DESCRIPTION OF THE DRAWINGS

FIG. 1 shows an FM transmitter, as known in the art;

FIG. 2A shows a constellation diagram for the FM transmitter shown in FIG. 1;

FIG. 2B shows a frequency domain transmitter power spectrum characteristic resulting from modulation performed by the FM transmitter shown in FIG. 1;

FIG. 2C shows another frequency domain transmitter power spectrum characteristic, in accordance with the FM transmission scheme shown in FIG. 1;

FIG. 3 shows a multi-level linear modulator transmission scheme, as is known in the art;

FIG. 4B shows a constellation diagram associated with the linear modulation transmitter shown in FIG. 3;

DETAILED DESCRIPTION OF THE PREFERRED EMBODIMENT

The present invention encompasses a method and apparatus that enables the enhanced transmission of signals in a narrow bandwidth application, where such signals are characterized by a high delay spread. The data transmitter includes a differential phase shift modulator for producing in-phase and quadrature components of a data stream (e.g., four-level) inputted at a predetermined symbol rate, which corresponds to a symbol period. A processing function is provided that has a frequency domain sin(x)/x characteristic. This function in turn produces a time domain transfer characteristic for producing a signal level that remains within a predetermined range of a desired data constellation point for a duration that exceeds 25% of the symbol period. By processing the in-phase (I) and quadrature (Q) components using the aforementioned function, and then band-limiting or filtering the processed response to produce a unique modulation function, a modulated signal is produced that is usable in a low channel bandwidth-to-modulation symbol rate ratio ($BW:R_S$) application, such as the APCO-25 communications environment. As a further benefit, the site separation for a plurality of distally separated repeaters in a simulcast communication system can be increased dramatically (e.g., greater than 15 miles) without the deleterious effects as seen in prior art systems.

Figure 4A:
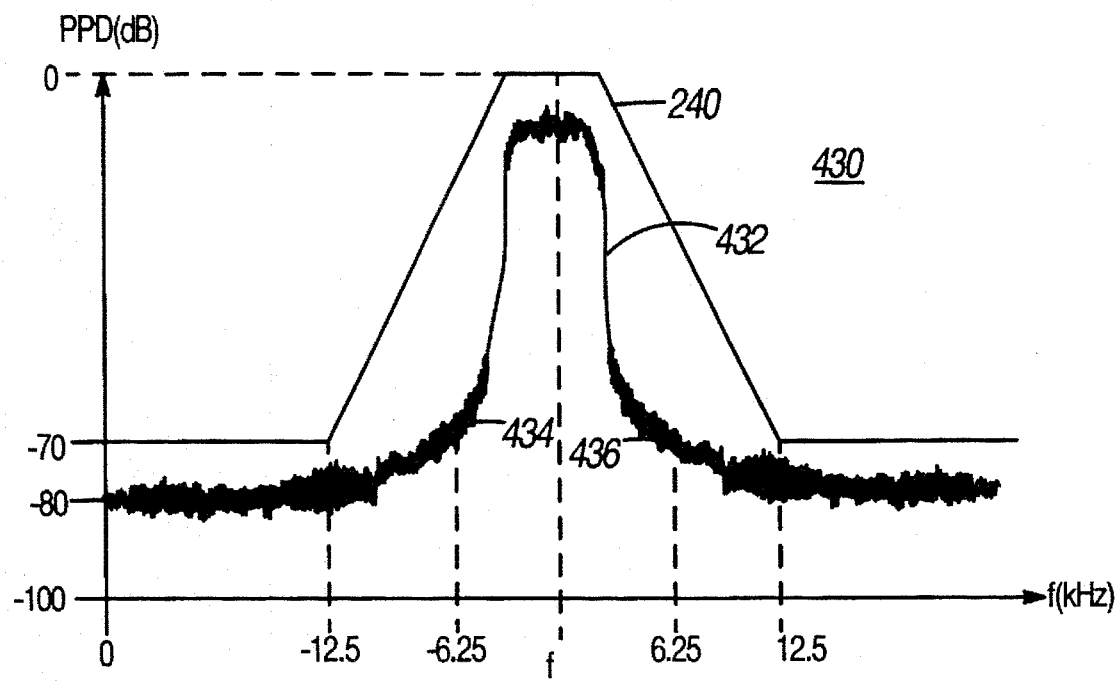
FIG. 4A shows a frequency domain transmitter power spectrum characteristic resulting from the transmission scheme shown in FIG. 3.
Figure 5A:
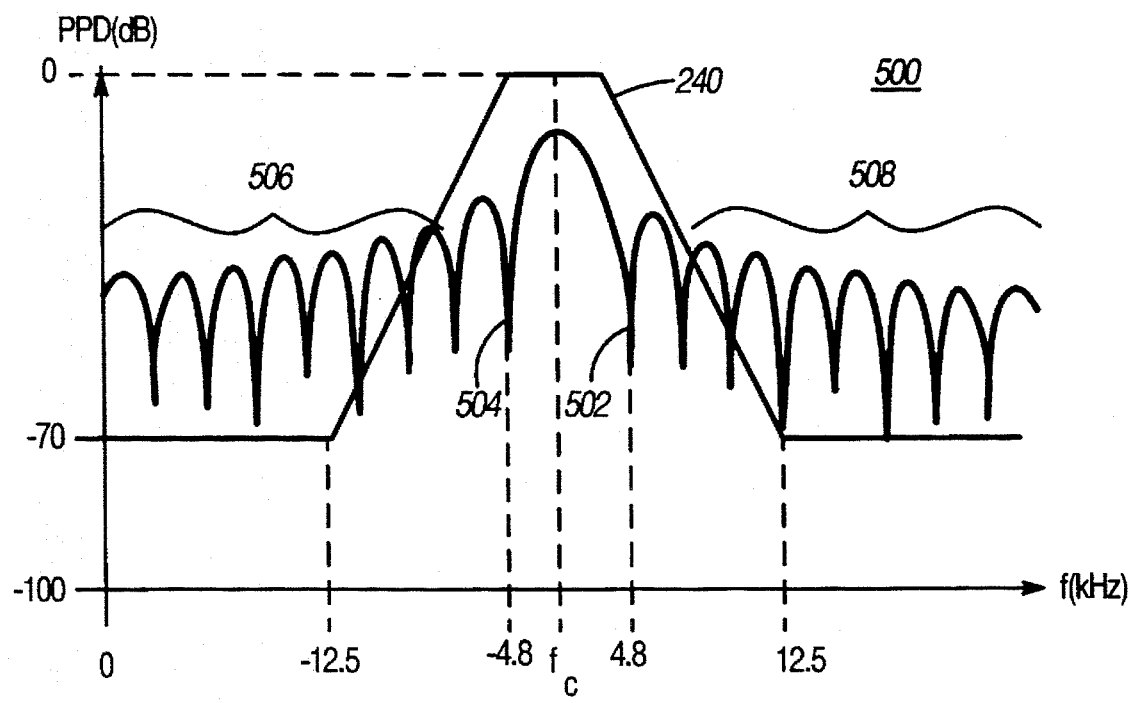
FIG. 5A shows a frequency domain transmitter power spectrum characteristic of a specialized modulation function, in accordance with the present invention.
Figure 5B:
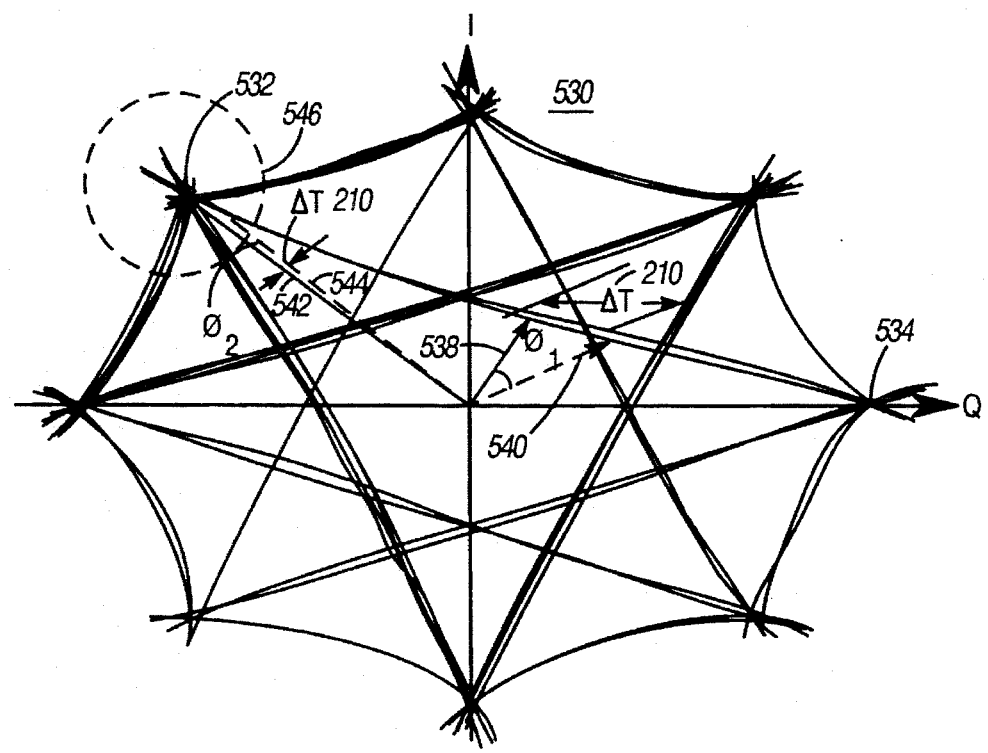
FIG. 5B shows a constellation diagram depicting constellation transitions, in accordance with the present invention.
Figure 5C:
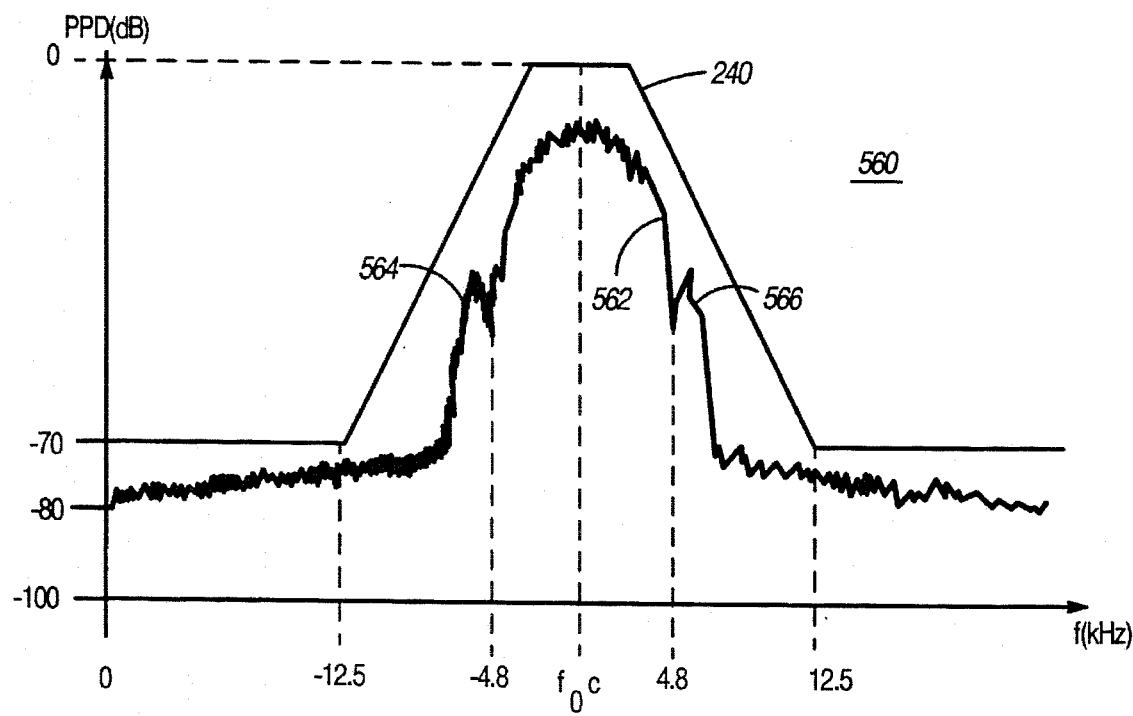
FIG. 5C shows a frequency domain transmitter power spectrum characteristic resulting from use of a band-limited version of the specialized modulation function shown in FIG. 5A.

The present invention can be better understood with reference to FIGS. 5A–5C. FIG. 5A shows a frequency domain transfer characteristic 500 for a pulse shaping function, in accordance with the present invention. The pulse shaping function performs a frequency domain sin(x)/x transformation on the I and Q data streams, thereby producing the power spectrum curve 501 shown in FIG. 5A. It should be noted that side-lobe nulls 502, 504 are designed to fall at a frequency offset (from the carrier frequency) of plus and minus the value of the symbol rate. It is further noted that, while this processing produces the greatest immunity to multipath delay, the power spectrum has side lobes 506, 508 falling outside the required APCO-25 mask 240. These side lobes are filtered using a band-limiting process, as later described. It should also be noted that this processing does not necessarily minimize intersymbol interference, but is instead designed to minimize multipath interference.

FIG. 5B shows a constellation diagram 530, in accordance with the present invention. In particular, transitions are made in a time variant manner such that the information phasor remains within a predetermined range of a fixed data constellation point 532 for a predetermined minimal amount of time. In a preferred embodiment, this predetermined minimal amount of time ranges between 25% and 75% of the symbol period. In this manner, the phasor remains near (i.e., within the detection window) the constellation point being detected for a longer period, thereby decreasing the likelihood of a detection error in high delay spread environments. By contrast, the transitions between constellation points are made in the remaining percentage of time (i.e., 75%-25%), as later described. It should be noted that, for BW:$R_S$ ratios nearing 2.6, a preferred duration near the constellation points is 75% of the symbol rate, while lower percentages (e.g., 25%) might be acceptable durations for higher BW:$R_S$ ratios.

Of course, while delay spread immunity improves, adjacent channel splatter performance degrades with increasing duration percentages, so the designer is encouraged to use the duration percentage that optimizes both criteria for a particular application. This can be shown on the curve tracing the transition between constellation points 532 and 534. As before, the curve shows two equal ΔT 210 time increments separating two consecutive points on the modulation path generated. By way of example, phasors 538, 540 illustrate a phase transition ∅1 requiring a duration of ΔT 210, with slightly changing phasor amplitudes. Similarly, phasors 542, 544 show a phase transition ∅2 requiring the same duration ΔT 210, where ∅2 is dramatically smaller than ∅1. That is, the phase angle change rates differ substantially, depending on whether the modulation is near a constellation point (e.g., 532) or midway between constellation points (e.g., 532, 534).

The foregoing phase change rate comparison shows the ability of the unique processing function to vary the transition speed. Thus, the signal phasor can be made to remain within a predetermined range 546 around the data constellation points, while minimizing the transition time between constellation points. Further, an unexpected result occurs during the fast transition between constellation points. In particular, because the phasor amplitude is lowest at the point of maximum transition speed (e.g., phasor 538), the resulting effect on adjacent channel splatter is minimal. In a preferred embodiment, the adjacent channel power (as shown by the power density curve of FIG. 5C in the area of ±12.5 kHz from the center frequency) is at least 70 dB down from the carrier power, while the slope of the spectrum is greater than approximately 9 dB/kHz.

FIG. 5C shows a frequency domain power spectrum density curve 560, in accordance with the present invention. In particular, waveform 562 represents a processed, then band-limited response resulting from a differential phase shift modulation scheme. In this unique approach the block diagram of FIG. 3 is used with the exception that the processing functions F(w) 314 and 316 are modified. That is, the I and Q data streams are first transformed using a sin(x)/x frequency domain processing function (as shown in FIG. 5A, and band-limited using a filtering function that suppresses the side lobes otherwise falling outside the APCO-25 mask 240 (i.e., 506, 508 shown in FIG. 5A).

The sin(x)/x function has the effect of producing a variable rate of phase change on the modulation. This approach is counter to prior art practices, as it typically increases intersymbol interference, but is designed to instead reduce multipath interference. Of course, band limiting the response in this manner is necessary to maintain the response within the mask. Thus, the power spectrum density peak envelope curve 562 remains within the APCO-25 mask 240, while the magnitude of the first side lobes 564, 566 are substantially unaffected. As those skilled in the art will recognize, the presence of the side lobes is indicative of the longer detection period (i.e., within detection window 546 in FIG. 5A) resulting from the non-uniform phase transition rate of the present invention.

What is claimed is:

1. In a data transmitter that includes a linear modulator for producing in-phase and quadrature components of an inputted data stream at a predetermined symbol rate, a method of facilitating recovery of signals having favorable delay spread characteristics in a low channel bandwidth-to-modulation symbol rate ratio application, the method comprising the steps of:

processing at least the in-phase component using a pulse shaping function to produce a processed response whose time domain transfer characteristic remains within a predetermined range of a data constellation point for a duration that exceeds 25 percent of a symbol period corresponding to the predetermined symbol rate; and band-limiting the processed response to produce a modulation signal that is usable in the narrow bandwidth application.

2. The method of claim 1, wherein the step of processing comprises the step of transforming at least the in-phase component by applying thereto a function having a frequency domain transfer characteristic, F(ω), given by:

$$F(\omega)=c(\sin x)/x;$$

where;

c=constant; and x=frequency at which a transformed instantaneous value of the inputted data stream is evaluated.

3. The method of claim 1, wherein the predetermined symbol rate is substantially equal to 4.8 kilobits per second (kbps).

4. The method of claim 1, wherein the duration is substantially equal to 75 percent of the symbol period.

5. The method of claim 1, wherein the step of band-limiting comprises the step of limiting the filtered response for use in a 12.5 kHz channel spacing application.

6. The method of claim 1, wherein the data stream is formatted as a 4-level information signal.

7. The method of claim 6, wherein the step of band-limiting comprises the step of limiting the filtered response for use in a 12.5 kHz channel spacing application.

8. The method of claim 1, wherein the modulation signal meets a sideband spectrum specification given by:

$f_d$<2.5 kHz; when Att=0 dB;

2.5 kHz<$f_d$<12.5 kHz; when Att=7· ($f_d$−2.5 kHz) dB; and $f_d$>12.5 kHz; when Att=50+10log$_{10}$ dB (RFOP) or 70 (whichever is smaller)

where;

$f_d$=magnitude (in kHz) of a difference between an operating frequency and an emission component frequency;

Att=required attenuation level (in dB), such that a power level of the emission component is below an unmodulated output power level for the data transmitter; and RFOP=RF Output Power (in Watts) for the data transmitter.

9. The method of claim 1, wherein the modulation signal has an adjacent channel power ratio that is >=70 dB, and whose sensitivity to a frequency offset >=9 dB/ kHz.

10. A simulcast communication system, comprising:

a plurality of distally separated transmitters that each include a linear modulator for producing in-phase and quadrature components of a data stream inputted at a predetermined symbol rate, wherein each of the plurality of distally separated transmitters modulate information signals by;

processing at least the in-phase component using a pulse shaping function to produce a processed response whose time domain transfer characteristic remains within a predetermined range of a data constellation point for a duration that exceeds 25 percent of a symbol period corresponding to the predetermined symbol rate; and band-limiting the processed response to produce a modulation signal that is usable in the narrow bandwidth application a plurality of communication channels, each of the communication channels being separated by an amount less than 15 kHz; and a plurality of receivers, operably coupled to receive the modulated signal via one of the plurality of communication channels.

11. The simulcast system of claim 10, wherein the plurality of distally separated transmitters comprise pulse shaping means for processing the in-phase and quadrature components of the data stream according to a frequency domain equation:

$c(\sin x)/x;$ where;

c=constant; and x=frequency at which a transformed instantaneous value of the inputted data stream is evaluated.

12. The simulcast system of claim 10, wherein the predetermined symbol rate is substantially equal to 4.8 kilobits per second (kbps).

13. The simulcast system of claim 10, wherein the duration is substantially equal to 75 percent of the symbol period.

14. The simulcast system of claim 10, wherein the inputted data stream is formatted as a 4-level information signal.

15. The simulcast system of claim 10, wherein the plurality of distally separated transmitters are each separated by a distance that exceeds 15 miles.

16. A simulcast communication system, comprising:

a plurality of distally separated transmitters that each produce a modulation signal and comprise;

a multilevel encoder, operably configured to receive a data stream inputted at a predetermined symbol rate to produce an encoded data stream;

a differential phase shift modulator for producing in-phase and quadrature components of the encoded data stream;

a pulse shaping element, operably coupled to an output of the differential phase shift modulator, having a response whose time domain transfer characteristic remains within a predetermined range of a data constellation point for a duration that exceeds 25 percent of a symbol period corresponding to the predetermined symbol rate; and a band-limiting element, operably coupled to an output of the pulse shaping element, that facilitates use of the modulation signal in an APCO Project 25 application; and a plurality of communication channels, each of the communication channels being separated by an amount less than 15 kHz.

17. The simulcast system of claim 16, wherein the predetermined symbol rate is substantially equal to 4.8 kilobits per second (kbps).

18. The simulcast system of claim 16, wherein the duration is substantially equal to 75 percent of the symbol period.

19. The simulcast system of claim 16, wherein the multilevel encoder comprises a 4-level signal encoder.

20. The simulcast system of claim 16, wherein the plurality of distally separated transmitters are each separated by a distance that exceeds 15 miles.

\* \* \* \* \*